(12) United States Patent
Toda et al.

(10) Patent No.: US 10,471,719 B2
(45) Date of Patent: Nov. 12, 2019

(54) MANUFACTURING METHOD OF LIQUID SUPPLY COMPONENT

(71) Applicant: CANON KABUSHIKI KAISHA, Tokyo (JP)

(72) Inventors: Kyosuke Toda, Kawasaki (JP); Yukuo Yamaguchi, Tokyo (JP); Mikiya Umeyama, Tokyo (JP); Satoshi Oikawa, Yokohama (JP); Hiromasa Amma, Kawasaki (JP); Takuya Iwano, Inagi (JP); Satoshi Kimura, Kawasaki (JP); Naoko Tsujiuchi, Kawasaki (JP); Yasushi Iijima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/628,947

(22) Filed: Jun. 21, 2017

(65) Prior Publication Data

US 2017/0368829 A1 Dec. 28, 2017

(30) Foreign Application Priority Data

Jun. 28, 2016 (JP) ................................ 2016-127500

(51) Int. Cl.
| | |
|---|---|
| *B29C 45/14* | (2006.01) |
| *B41J 2/16* | (2006.01) |
| *B29C 45/16* | (2006.01) |
| *B41J 2/14* | (2006.01) |
| *B41J 2/175* | (2006.01) |
| *B01D 35/02* | (2006.01) |

(52) U.S. Cl.
CPC ............. *B41J 2/1637* (2013.01); *B29C 45/14* (2013.01); *B29C 45/16* (2013.01); *B41J 2/1404* (2013.01); *B41J 2/14024* (2013.01); *B41J 2/1752* (2013.01); *B41J 2/17513* (2013.01); *B41J 2/17553* (2013.01); *B41J 2/17563* (2013.01); *B01D 35/02* (2013.01); *B41J 2/14201* (2013.01); *B41J 2002/14403* (2013.01)

(58) Field of Classification Search
None
See application file for complete search history.

(56) References Cited

U.S. PATENT DOCUMENTS

| | | | | |
|---|---|---|---|---|
| 4,113,627 A | * | 9/1978 | Leason | B01D 19/0031 210/446 |
| 4,155,478 A | * | 5/1979 | Ogi | B29C 65/42 220/4.21 |
| 4,826,598 A | * | 5/1989 | Cain | B01D 35/0273 210/323.2 |
| 5,221,538 A | * | 6/1993 | Gasami | B29C 45/0062 264/328.11 |

(Continued)

FOREIGN PATENT DOCUMENTS

JP 5019061 B2 9/2012

*Primary Examiner* — Edmund H Lee
(74) *Attorney, Agent, or Firm* — Venable LLP

(57) ABSTRACT

A filter is compressed between facing surfaces of a first configuration component and a second configuration component, and a molten resin is poured in such a compressed state. Injection molding of the first configuration component and the second configuration component, joining of the configuration components, and sealing of the circumference of the filter are performed by a pair of metal molds.

9 Claims, 13 Drawing Sheets

(56) References Cited

U.S. PATENT DOCUMENTS

| | | | | |
|---|---|---|---|---|
| 5,413,743 A * | 5/1995 | Prophet | B29C 45/0062 | 264/1.7 |
| 5,556,541 A * | 9/1996 | Ruschke | A61M 1/3627 | 210/232 |
| 5,723,047 A * | 3/1998 | Turnbull | B01D 29/012 | 210/445 |
| 6,042,364 A * | 3/2000 | Nishida | B29C 45/0062 | 264/255 |
| 6,209,541 B1 * | 4/2001 | Wallace | A61M 16/1055 | 128/200.24 |
| 6,210,619 B1 * | 4/2001 | Owens | B29C 45/0062 | 264/255 |
| 6,299,816 B1 * | 10/2001 | Takemoto | B29C 45/0062 | 264/250 |
| 6,372,170 B1 * | 4/2002 | Nishida | B29C 45/0062 | 264/255 |
| 6,375,699 B1 * | 4/2002 | Beck | B29C 45/14418 | 264/257 |
| 6,403,008 B1 * | 6/2002 | Schann | B01D 29/012 | 156/60 |
| 6,428,730 B1 * | 8/2002 | Nishida | B29C 45/006 | 264/255 |
| 6,981,860 B2 * | 1/2006 | Takemoto | B29C 45/0062 | 425/116 |
| 7,147,816 B2 * | 12/2006 | Nishida | B29C 45/0062 | 264/255 |
| 7,837,460 B2 * | 11/2010 | Nishida | B29C 37/0028 | 264/255 |
| 8,136,674 B2 * | 3/2012 | Oki | B01D 27/005 | 210/416.4 |
| 2009/0225142 A1 | 9/2009 | Kamikura | | |
| 2016/0346967 A1 | 12/2016 | Oikawa et al. | | |
| 2016/0346968 A1 | 12/2016 | Kimura et al. | | |
| 2016/0346969 A1 | 12/2016 | Toda et al. | | |
| 2016/0347072 A1 | 12/2016 | Iwano et al. | | |

* cited by examiner

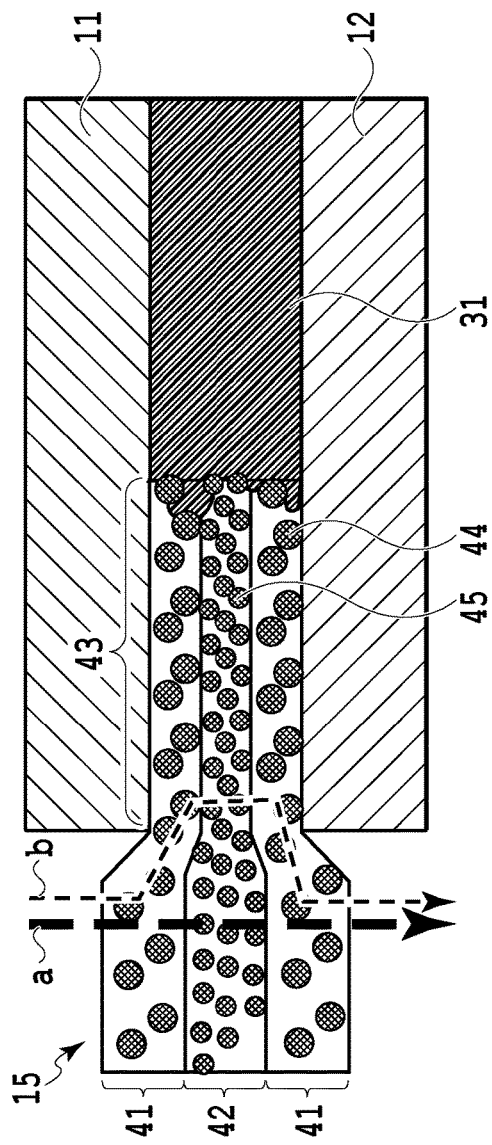
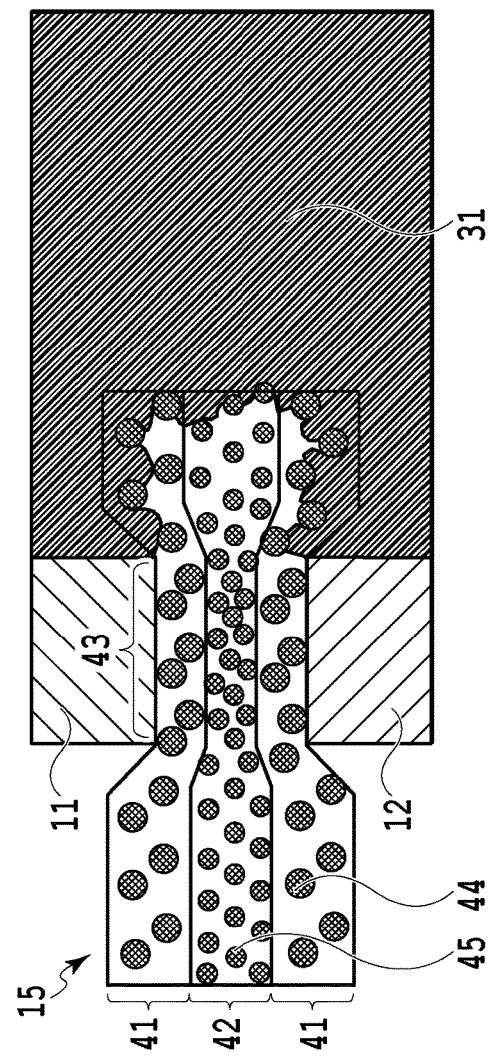

MANUFACTURING METHOD OF LIQUID SUPPLY COMPONENT

BACKGROUND OF THE INVENTION

Field of the Invention

The present invention relates to a manufacturing method of a liquid supply component in which a liquid supply path is formed, a manufacturing apparatus of a liquid supply component, a liquid supply component, and a liquid ejection head.

Description of the Related Art

In Japanese Patent No. 5019061, a method is described in which a filter is interposed between two configuration components configuring a liquid supply component such that the filter is positioned in a liquid supply path, and then, the circumference of the filter is filled with a molten resin, and thus, two configuration components are bonded together. The molten resin is actively infiltrated into the circumference of the filter, and thus, a space between two configuration components and the filter is sealed.

As described in Japanese Patent No. 5019061, in a case where the molten resin is actively infiltrated into the circumference of the filter, there is a concern that a variation occurs in an effective area of the filter, according to the degree of infiltration of the resin material.

SUMMARY OF THE INVENTION

The invention provides a manufacturing method of a liquid supply component in which it is possible to increase a manufacturing efficiency of the liquid supply component while stably ensuring an effective area of a filter, a manufacturing apparatus of a liquid supply component, a liquid supply component, and a liquid ejection head.

In the first aspect of the present invention, there is provided a manufacturing method of a liquid supply component in which a first configuration component and a second configuration component are joined together such that a first opening portion of the first configuration component and a second opening portion of the second configuration component face each other, and thus, a liquid supply path communicating through the first opening portion and the second opening portion is formed, the method comprising:

a first step of performing injection molding with respect to the first configuration component in a first position between a pair of metal molds, and of performing injection molding with respect to the second configuration component in a second position between the pair of metal molds;

a second step of opening the pair of metal molds such that the first configuration component remains in one of the pair of metal molds, and the second configuration component remains in the other metal mold, and of relatively moving the pair of metal molds such that the first configuration component and the second configuration component face each other;

a third step of interposing a filter between the first opening portion and the second opening portion;

a fourth step of closing the pair of metal molds such that the filter is compressed between facing surfaces of the first configuration component and the second configuration component; and a fifth step of pouring a molten resin between the facing surfaces.

In the second aspect of the present invention, there is provided a manufacturing apparatus for a liquid supply component in which a first configuration component and a second configuration component are joined together such that a first opening portion of the first configuration component and a second opening portion of the second configuration component face each other, and thus, a liquid supply path communicating through the first opening portion and the second opening portion is formed, the manufacturing apparatus comprising:

a pair of metal molds;

a molding unit configured to perform injection molding with respect to the first configuration component in a first position between the pair of metal molds, and perform injection molding with respect to the second configuration component in a second position between the pair of metal molds;

a moving unit configured to open the pair of metal molds such that the first configuration component remains in one of the pair of metal molds, and the second configuration component remains in the other metal mold, and to relatively move the pair of metal molds such that the first configuration component and the second configuration component face each other;

a mold closing unit configured to close the pair of metal molds such that a filter interposed between the first opening portion and the second opening portion is compressed between facing surfaces of the first configuration component and the second configuration component; and a pouring unit configured to pour a molten resin between the facing surfaces.

In the third aspect of the present invention, there is provided a liquid supply component in which a first configuration component and a second configuration component are joined together such that a first opening portion of the first configuration component and a second opening portion of the second configuration component face each other, and thus, a liquid supply path communicating through the first opening portion and the second opening portion is formed, wherein the liquid supply component is manufactured by a manufacturing method, the manufacturing method comprising:

a first step of performing injection molding with respect to the first configuration component in a first position between a pair of metal molds, and of performing injection molding with respect to the second configuration component in a second position between the pair of metal molds;

a second step of opening the pair of metal molds such that the first configuration component remains in one of the pair of metal molds, and the second configuration component remains in the other metal mold, and of relatively moving the pair of metal molds such that the first configuration component and the second configuration component face each other;

a third step of interposing a filter between the first opening portion and the second opening portion;

a fourth step of closing the pair of metal molds such that the filter is compressed between facing surfaces of the first configuration component and the second configuration component; and a fifth step of pouring a molten resin between the facing surfaces.

In the fourth aspect of the present invention, there is provided a liquid ejection head, comprising:

a liquid supply component in which a first configuration component and a second configuration component are joined together such that a first opening portion of the first configuration component and a second opening portion of the second configuration component face each other, and thus, a liquid supply path communicating through the first opening portion and the second opening portion is formed; and an ejection unit capable of ejecting a liquid which is supplied from the liquid supply path of the liquid supply component, wherein the liquid supply component is manufactured by a manufacturing method, the manufacturing method comprising:

a first step of performing injection molding with respect to the first configuration component in a first position between a pair of metal molds, and of performing injection molding with respect to the second configuration component in a second position between the pair of metal molds;

a second step of opening the pair of metal molds such that the first configuration component remains in one of the pair of metal molds, and the second configuration component remains in the other metal mold, and of relatively moving the pair of metal molds such that the first configuration component and the second configuration component face each other;

a third step of interposing a filter between the first opening portion and the second opening portion;

a fourth step of closing the pair of metal molds such that the filter is compressed between facing surfaces of the first configuration component and the second configuration component; and a fifth step of pouring a molten resin between the facing surfaces.

According to the invention, a filter is compressed between facing surfaces of a first configuration component and a second configuration component, and a molten resin is poured in such a compressed state, and thus, it is possible to suppress the molten resin from entering the filter, and to stably ensure the effective area of the filter. Moreover, injection molding of the first configuration component and the second configuration component, joining of the configuration components, and sealing of the circumference of the filter are performed in the same metal mold, and thus, it is possible to efficiently manufacture a liquid supply component with a high dimension accuracy.

Further features of the present invention will become apparent from the following description of exemplary embodiments with reference to the attached drawings.

BRIEF DESCRIPTION OF THE DRAWINGS

FIG. 7A is an enlarged view of a VIIA portion of FIG. 6B, and FIG. 7B is an explanatory diagram of an example different from the VIIA portion of FIG. 6B;

DESCRIPTION OF THE EMBODIMENTS

Hereinafter, embodiments of the invention will be described with reference to the drawings.

Figure 1:
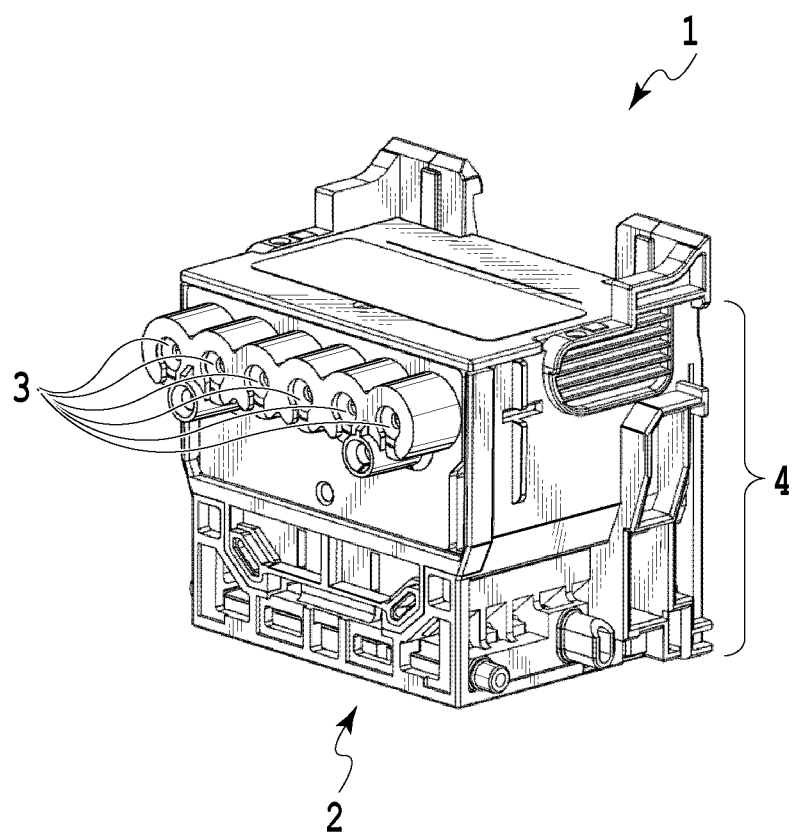
FIG. 1 is a perspective view of a printing head as a liquid ejection head of the invention.

FIG. 1 is a perspective view of an ink jet printing head (a liquid ejection head) 1 of this embodiment. An ink (a printing liquid) supplied from a storage vessel (not illustrated) is supplied to a flow path constituent body (a liquid supply component) 4 through a tube or the like (not illustrated) which is connected to an introducing port 3. The printing head 1 includes a printing element portion (an ejection unit) 2 which is capable of ejecting the ink towards a lower side in FIG. 1, and the flow path constituent body 4 forms an ink supply path (a liquid supply path) between the introducing port 3 and the printing element portion 2. In this example, six ink supply paths corresponding to six introducing ports 3 are formed.

Figure 2:
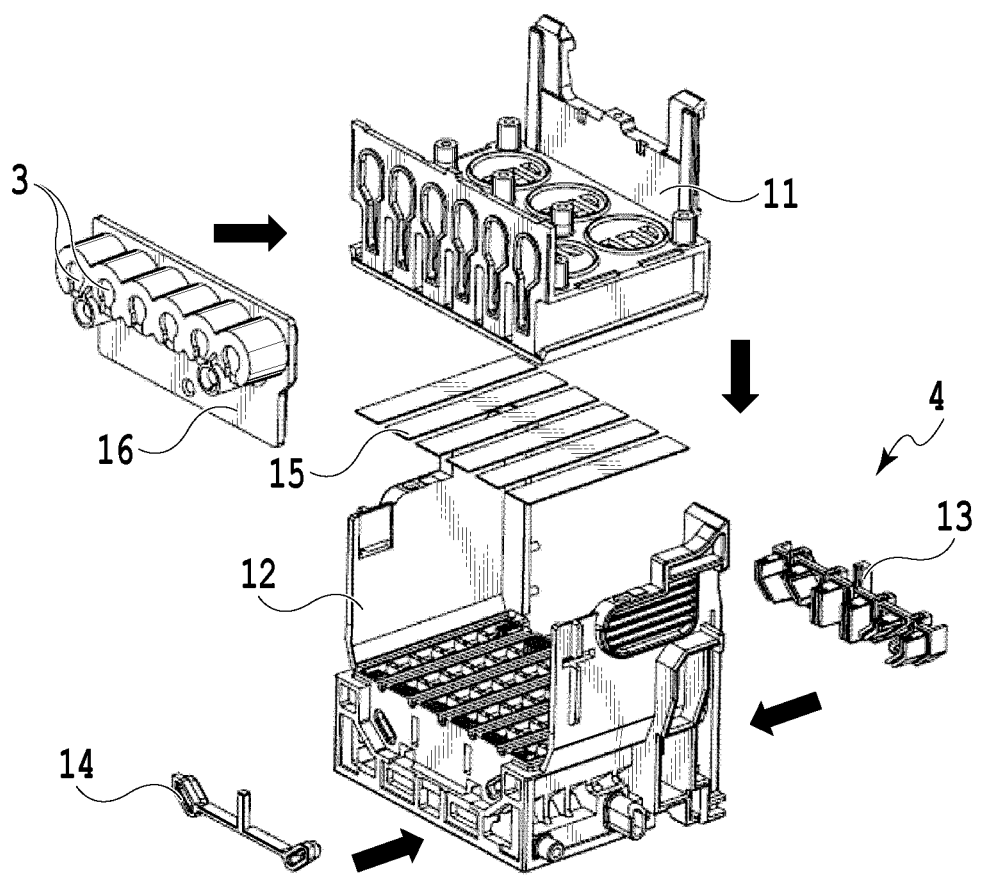
FIG. 2 is an exploded perspective view of the printing head of FIG. 1.
Figure 3:
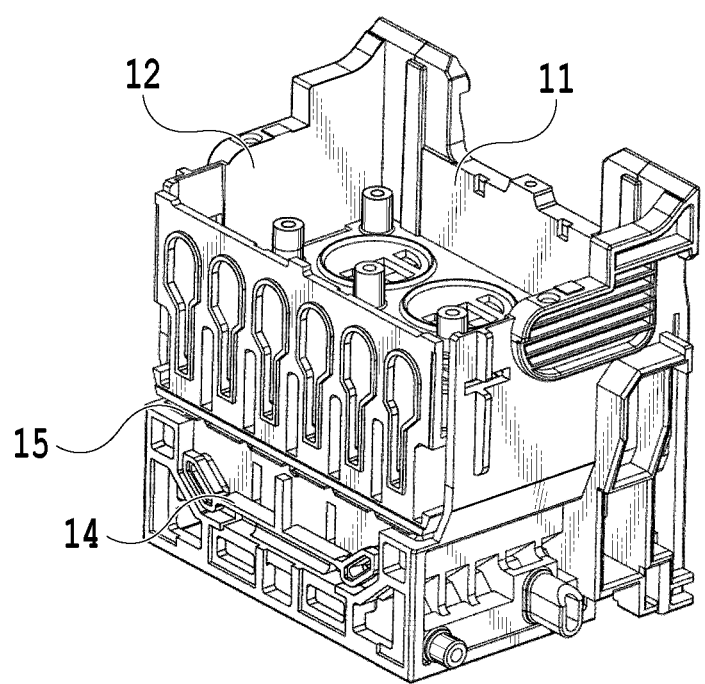
FIG. 3 is a perspective view in an intermediate stage of manufacturing of the printing head of FIG. 1.
Figure 4A:
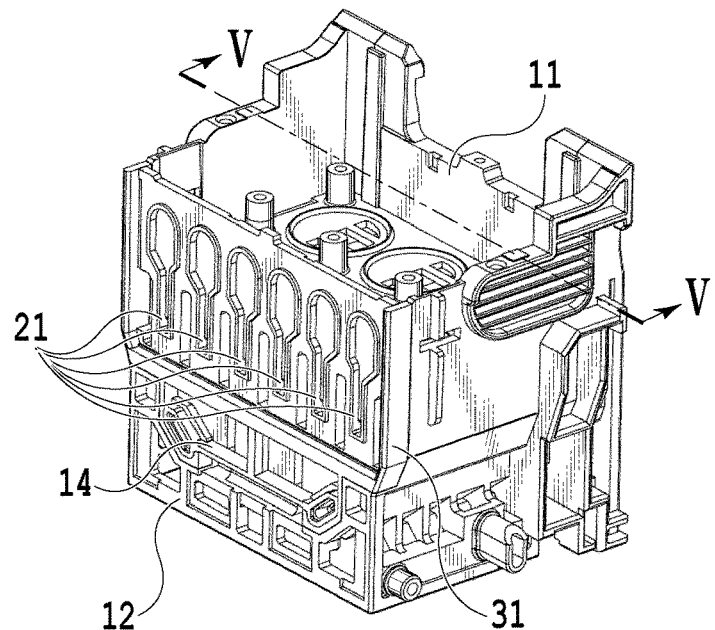
FIG. 4A and FIG. 4B are respectively perspective views in the intermediate stage of the manufacturing of the printing head of FIG. 1.
Figure 4B:
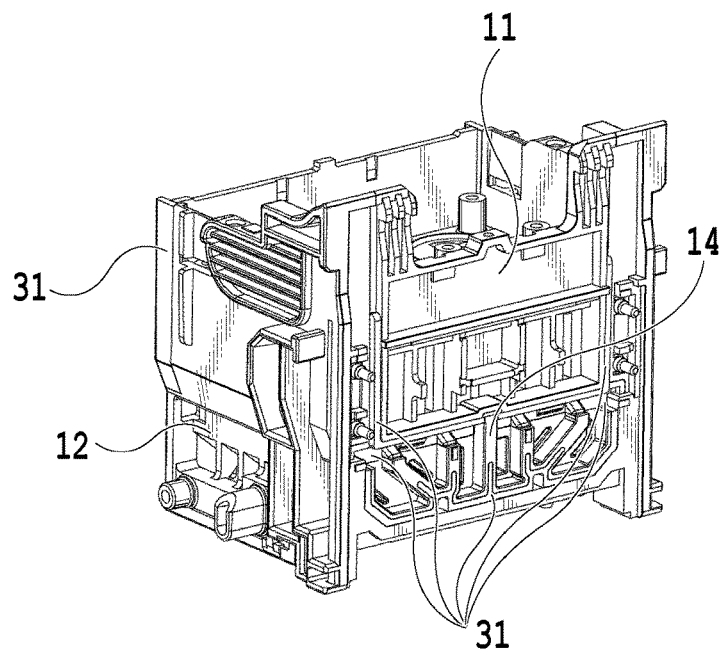

FIG. 2 is an exploded perspective view of the flow path constituent body 4. The flow path constituent body 4 includes a first flow path forming member (a first configuration component) 11, a second flow path forming member (a second configuration component) 12, a first cover member 13, a second cover member 14, a filter 15, and an introducing port forming member 16. In this embodiment, as described below, the first flow path forming member (hereinafter, also referred to as a "first forming member") 11, the second flow path forming member (hereinafter, also referred to as a "second forming member") 12, the first cover member 13, and the second cover member 14 are primarily molded (refer to FIG. 3). Then, a primary molded body which is primarily molded as described above, and the filter 15 are assembled in a metal mold, and then, as illustrated in FIG. 4A and FIG. 4B, the assembly is fixed by a secondary injection molding resin (a molten resin) 31. Accordingly, it is possible to reduce the number of components and man-hours.

A case of individually joining a configuration member of the flow path constituent body 4 is assumed as a comparative example. For example, the filter 15 is fixed to the first forming member 11 by heat-welding, the first and second forming members 11 and 12 are joined together by an adhesive agent, and the first and second cover members 13 and 14 are joined to the second forming member 12 by the adhesive agent. Further, the introducing port forming member 16 is joined to the first forming member 11 by vibration-welding. According to such a method, it is difficult to increase a manufacturing efficiency of the printing head 1.

The filter 15 of this example has a three-layer configuration as illustrated in FIG. 7A. That is, a filter layer 42 in the center is formed of a sintered nonwoven fabric SUS filter having high dust collecting capacity (collecting capacity of approximately 7µ), which is manufactured by a stainless steel fiber having a wire diameter of 4 microns. Further, a filter layer 41 on the outside of the filter 15 is formed of a sintered nonwoven fabric SUS filter (collecting capacity of approximately 30µ), which is manufactured by a stainless steel fiber having a wire diameter of 12 microns, in order to maintain rigidity of the filter 15. In order to satisfy ink supply performance while maintaining the dust collecting capacity, the area of the filter 15 is required to be enlarged. In such a point, the filter as in this example, that is, a laminated filter of greater than or equal to two layers of the filter layer 42 determining collection performance and the filter layer 41 maintaining the rigidity is effective. In addition, in order to ensure stability of a filter dimension and handling performance of a robot or the like for inserting the filter into a metal mold, the laminated filter having high rigidity as in this example is effective. A laminated filter of two layers may be used according to the area and the rigidity required for the filter.

Figure 5:
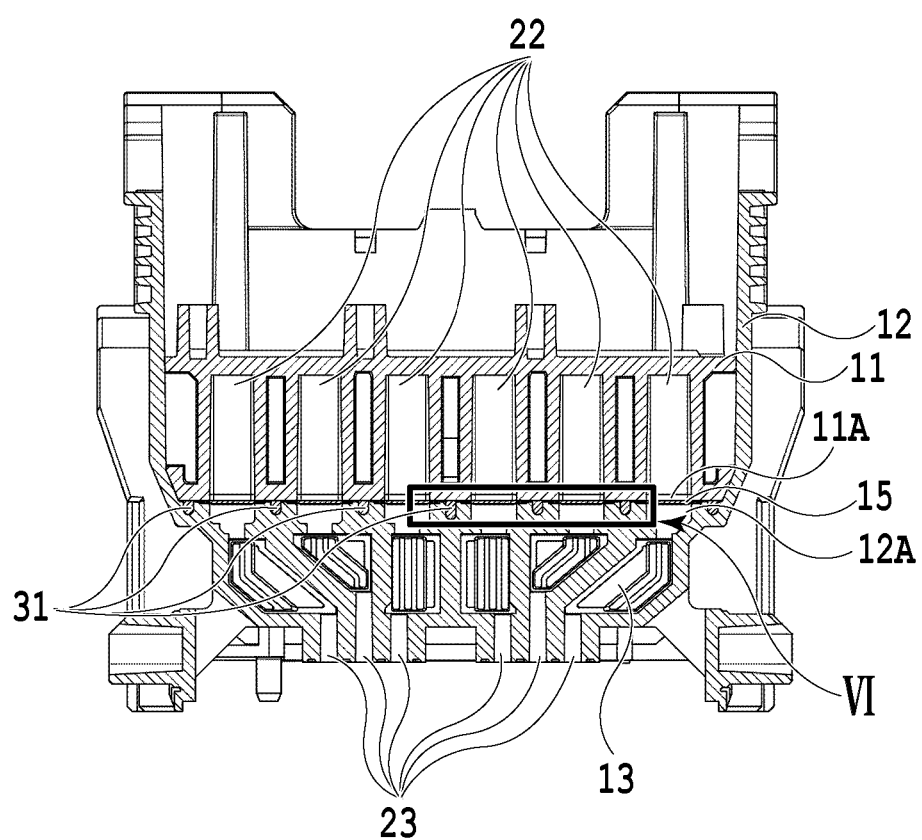
FIG. 5 is a sectional view taken along line V-V of FIG. 4A.

Next, the flow path constituent body 4 in a state of being integrated by secondary injection molding will be described by using FIG. 5. FIG. 5 is a sectional view taken along line V-V of FIG. 4A.

The introducing port forming member 16 forming the introducing port 3 is connected to the first forming member 11, and a sub-tank portion (a liquid storage space) 22 communicating with the introducing port 3 is formed in the first forming member 11. In this example, six sub-tank portions 22 corresponding to six introducing port 3 are formed. The sub-tank portion 22 has a sub-tank introducing port 21 (refer to FIG. 4A) communicating with the introducing port 3 of the introducing port forming member 16. An ink supply port 23 communicating with the printing element portion 2 is formed in the second forming member 12. An ink supply path communicating between the sub-tank portion 22 and the ink supply port 23 is formed by the second forming member 12, the first cover member 13, and the second cover member 14, and the ink in the sub-tank portion 22 is supplied to the printing element portion 2 through the ink supply path. In this example, six ink supply paths are formed between six sub-tank portions 22 and six ink supply ports 23. The flow path constituent body 4 includes a plurality of sub-tank portions 22, which are large liquid chambers trapping air bubbles or dust in the ink, a plurality of ink supply ports 23 having a pitch which is narrower than a pitch between each of the sub-tank portions 22, and a plurality of curved ink supply paths communicating between the sub-tank portions 22 and the ink supply ports 23.

As illustrated in FIG. 5, a first opening portion 11A communicating with the sub-tank portion 22 is formed in the first forming member 11, and a second opening portion 12A communicating with the ink supply port 23 through the curved flow path is formed in the second forming member 12. An ink supply path is formed through the opening portions 11A and 12A. In addition, the filter 15 is interposed between the opening portions 11A and 12A.

Six pairs of printing element portion 2 are provided in order to correspond to six ink supply ports 23. A plurality of electrothermal conversion elements (heaters), piezo elements, or the like are arranged in the printing element portion 2, as an ejection energy generating element for ejecting an ink, and the printing element portion 2 is configured to eject the ink supplied through the ink supply path from the ejection port. In a case where the electrothermal conversion element is used, it is possible to foam the ink by generated heat, and to eject the ink from the ejection port by using such foaming energy.

As illustrated in FIG. 5, six filters 15 corresponding to six sub-tank portions 22 are interposed between the first forming member 11 and the second forming member 12, and the circumference thereof is sealed with the secondary molding resin 31. FIG. 6B is an enlarged schematic view of a VI portion of FIG. 5.

Figure 6A:
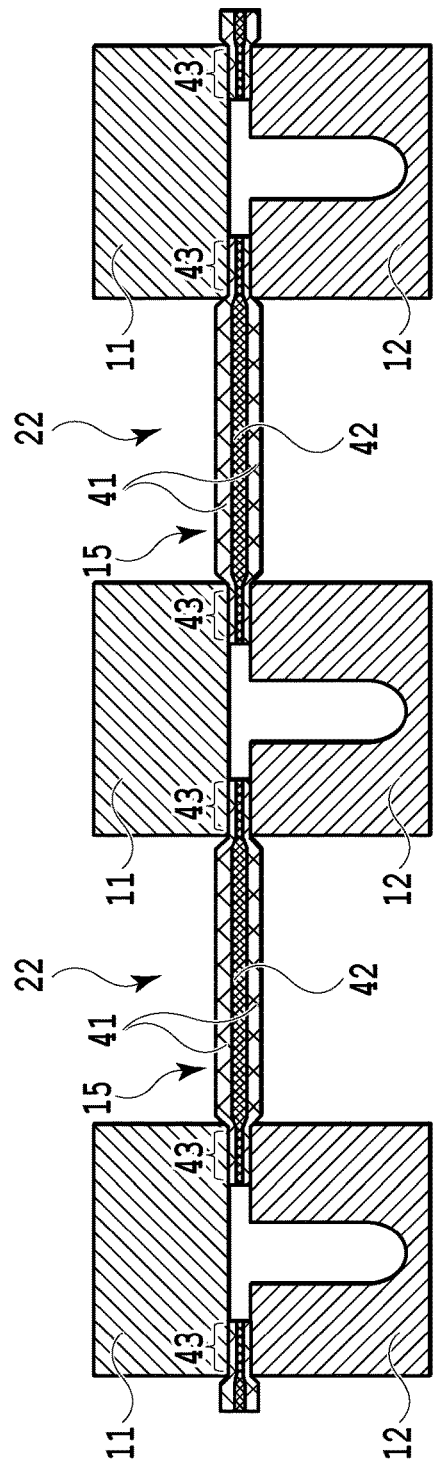
FIG. 6A is an enlarged view of a VI portion of FIG. 5 before secondary injection molding.
Figure 6B:
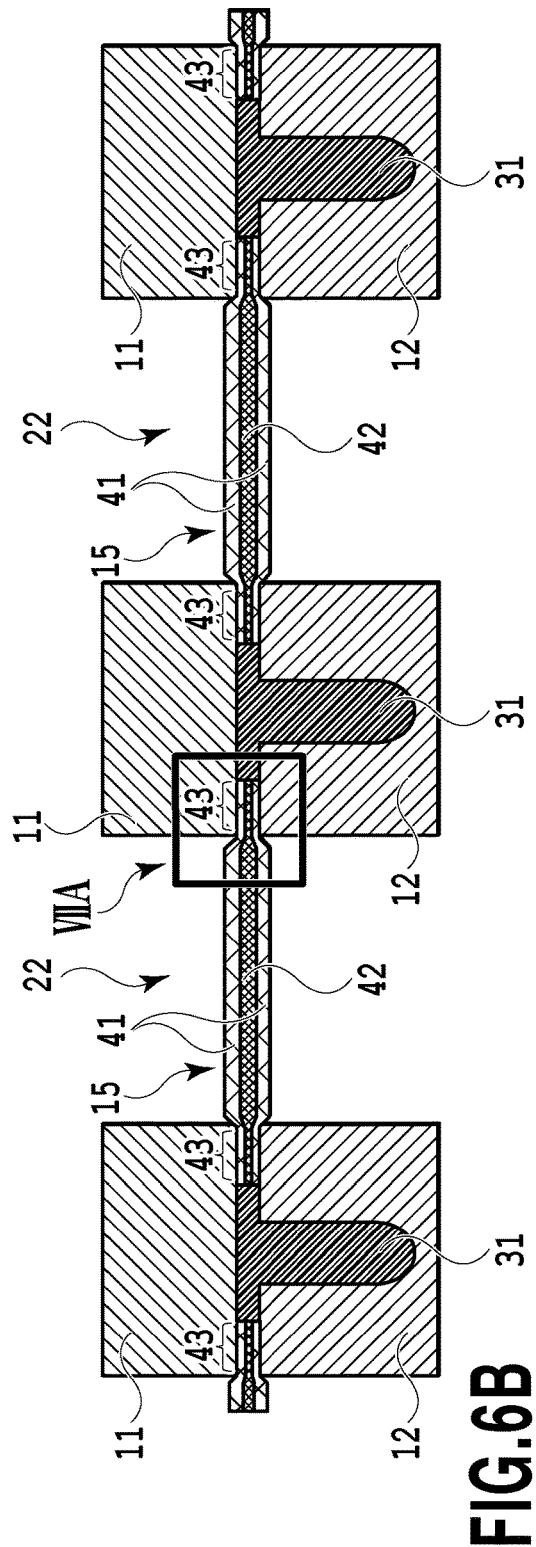
FIG. 6B is an enlarged view of a VI portion of FIG. 5.

FIG. 6A illustrates a state where the flow path constituent body 4 is assembled before being integrated by the secondary injection molding, and a circumferential portion of the filter 15 having a three-layer configuration is compressed and retained by a filter retaining portion 43 of the first and second forming members 11 and 12. The filter 15 of this example has an original thickness of 0.3 mm, and is compressed such that the original thickness is less than or equal to a half. An opening diameter of the filter 15 is compressed as described above, and thus, becomes smaller than that at the time of not being compressed. FIG. 6B illustrates the flow path constituent body 4 integrated by the secondary injection molding, and the circumference of the filter 15 is sealed with the secondary molding resin 31. The separation between the filters 15 and the joining between the first and second forming members 11 and 12 are simultaneously performed by the secondary molding resin 31. The sub-tank portions 22 are separated from each other and the ink supply paths are separated from each other by the separation between the filters 15.

FIG. 7A is an enlarged view of a VIIA portion in FIG. 6B. The filter layer 41 on the outside of the filter 15 is configured of an SUS wire 44, and the filter layer 42 in the center of the filter 15 is configured of an SUS thin wire 45 having a narrower diameter. The filter layers 41 and 42 are compressed by the filter retaining portion 43, and thus, a void to be formed by the SUS wire 44 and the SUS thin wire 45 narrows. In this example, both filter openings of the filter layers 41 and 42 narrows to be approximately less than or equal to 15µ by the filter retaining portion 43. Accordingly, as illustrated in FIG. 7A, the secondary molding resin 31 is capable of flowing around from a surface layer of the filter 15 to several µm, but is not capable of flowing into the filter 15. Thus, the entire circumference of the filter layers 41 and 42 of the filter 15 is sealed. Therefore, the ink does not pass through only the filter layer 41 having comparatively low collecting capacity of the air bubbles or the dust in the ink, and thus, the filter 15 is capable of exhibiting desired collecting capacity.

In this example, the void of the filter 15 is compressed by the filter retaining portion 43, and thus, a pressure loss in a region of such a compressed portion increases. For this reason, most of the ink flows along a route "a" in FIG. 7A, but does not flow along a route "b", and thus, it is possible to stably ensure an effective area of the filter 15. It is possible to suppress a variation in the effective area of the filter 15 to be small, and thus, it is possible to supply an ink to which a pressure as designed is applied to the printing head, and to stably eject the ink. For example, in a case where the ink flow paths are separated from each other by allowing the secondary molding resin to flow into the filter, as a comparative example, the effective area of the filter corresponds to a portion into which the secondary molding resin flows, and thus, it is difficult to stably set the effective area of the filter.

In addition, in this example, the first and second forming members 11 and 12 receive a clamping force in the metal mold before the secondary injection molding, and thus, the filter 15 is compressed and deformed by the filter retaining portion 43. For this reason, a void of a portion of the compressed and deformed filter 15 becomes smaller than a void of that before being compressed. Thus, the portion of the filter 15 of which the void becomes smaller, becomes strong against shear deformation, and thus, it is possible to suppress the occurrence of the twisting and the deformation of the entire filter due to the pressure or the like of the resin at the time of the secondary injection molding. In a case where the filter is simply interposed between the first and second forming members without being compressed, as a comparative example, a portion of the interposed filter is comparatively easily deformed by the void which is not compressed. For this reason, the filter is subjected to shear deformation due to the pressure of the resin at the time of the secondary injection molding, and there is a concern that the filter and the secondary molding resin enters the ink supply path. In a case where the filter and the secondary molding resin enters the ink supply path, it is not possible to ensure a desired flow path area of the ink supply path and the effective area of the filter, and not to perform normal ink supply, and thus, there is a concern that an ink ejection failure occurs.

FIG. 7B is an explanatory diagram of a modification example of the filter retaining portion 43 of the first and second forming members 11 and 12. The filter retaining portion 43 may compress and fix a portion of the filter 15, which has a necessary width, and as illustrated in FIG. 7B, may seal not only an end surface of the circumference of the filter 15 but also an upper surface and a lower surface of the circumference with the secondary molding resin 31. The forming members 11 and 12 are rarely deformed as the pressure of the secondary molding resin 31 decreases, and thus, there is a case where increasing a sectional area of a flow path of the secondary molding resin 31 is effective according to a sealing distance or the like of the secondary molding resin 31.

In addition, the secondary molding resin 31 does not flow into the filter 15. On the other hand, gas of the like generated at the time of the secondary injection molding can be discharged through a gap of approximately 10μ. For this reason, in the metal mold of this example, a gas vent for discharging gas in a hollow portion of the first forming member 11 to the atmosphere is provided in a portion of the metal mold facing the hollow portion of the first forming member 11. Accordingly, it is possible to reduce a possibility that the secondary molding resin 31 includes air bubbles or the like, and to suppress the occurrence of a molding failure due to a leakage of the secondary molding resin 31 between the flow paths.

Next, a manufacturing method of the flow path constituent body 4 will be described.

Figure 8:
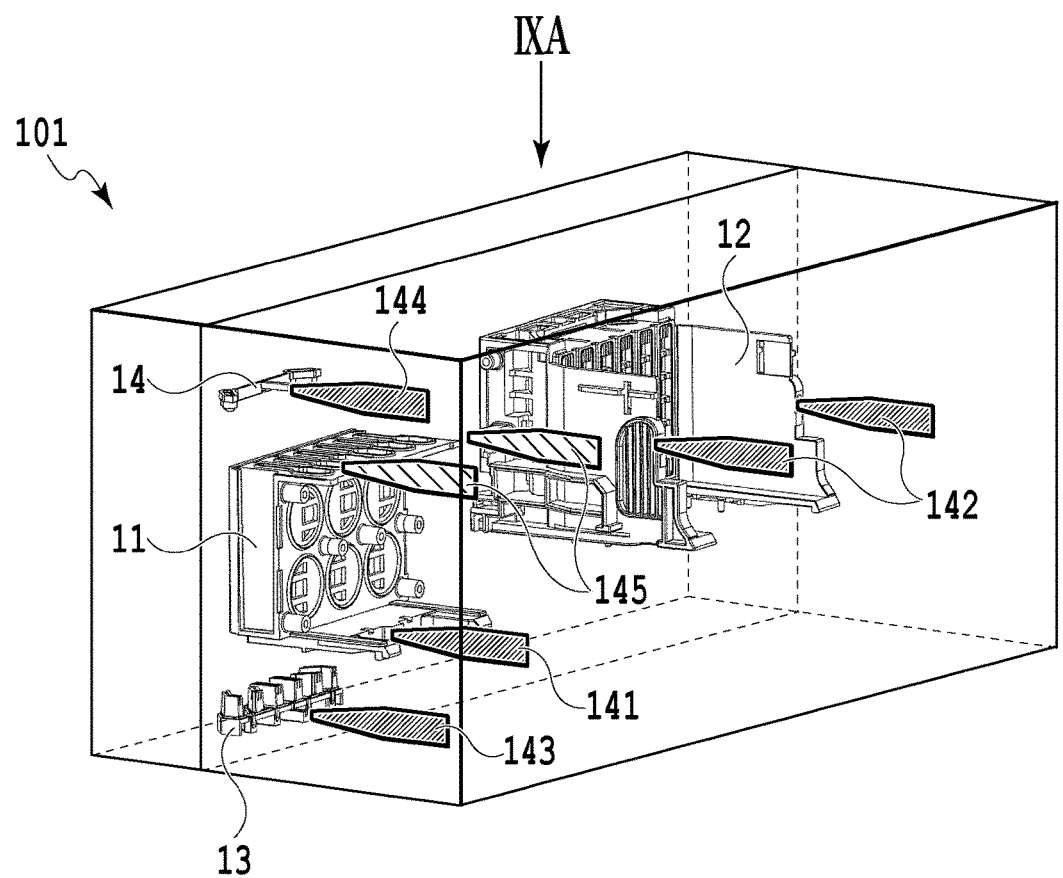
FIG. 8 is a schematic perspective view of a metal mold used in the invention.

FIG. 8 is a schematic perspective view of a metal mold 101 for manufacturing the flow path constituent body 4. The metal mold 101 includes a primary molding gate 141 for molding the first forming member 11 and a primary molding gate 142 for molding the second forming member 12. In addition, the metal mold 101 includes a primary molding gate 143 for molding the first cover member 13 and a primary molding gate 144 for molding the second cover member 14. Further, the metal mold 101 includes a secondary molding gate 145 for joining by the secondary molding resin 31.

Figure 9A:
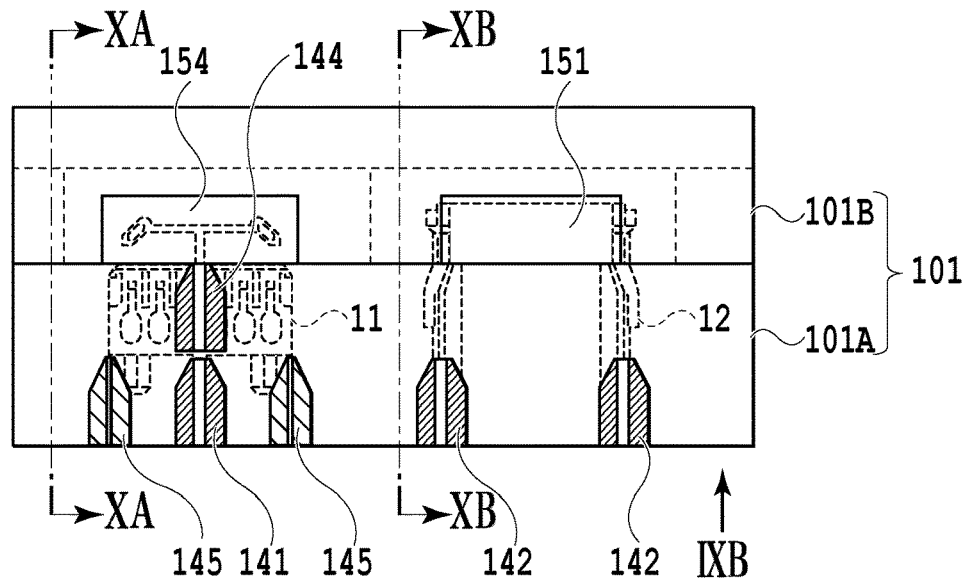
FIG. 9A is a schematic plan view of the metal mold of FIG. 8.
Figure 9B:
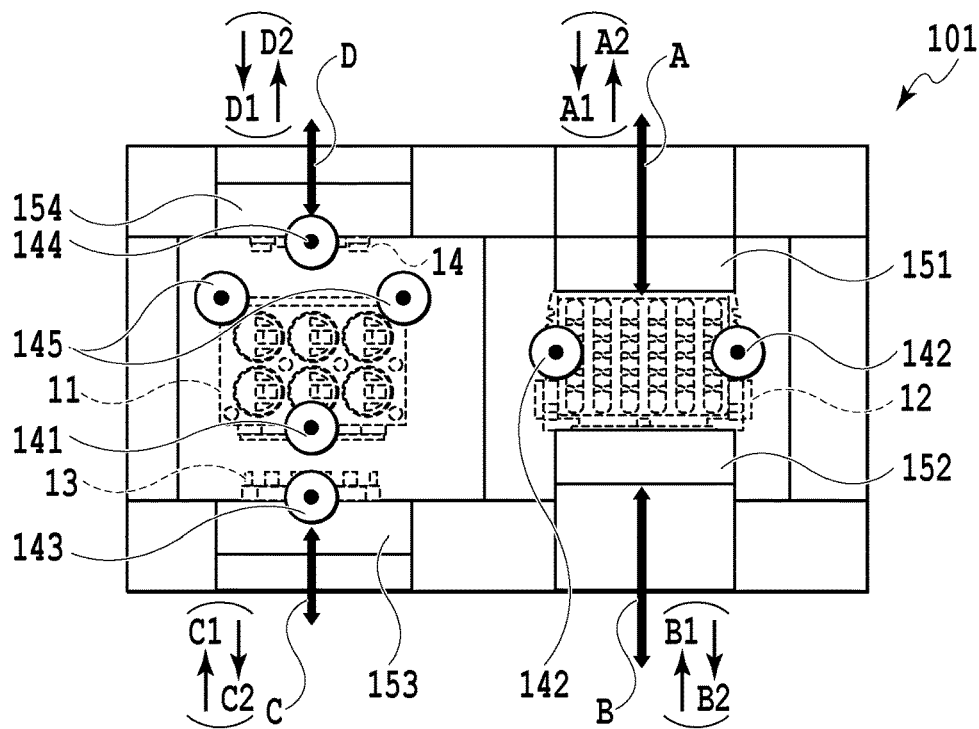
FIG. 9B is a schematic front view of the metal mold of FIG. 8.
Figure 10A:
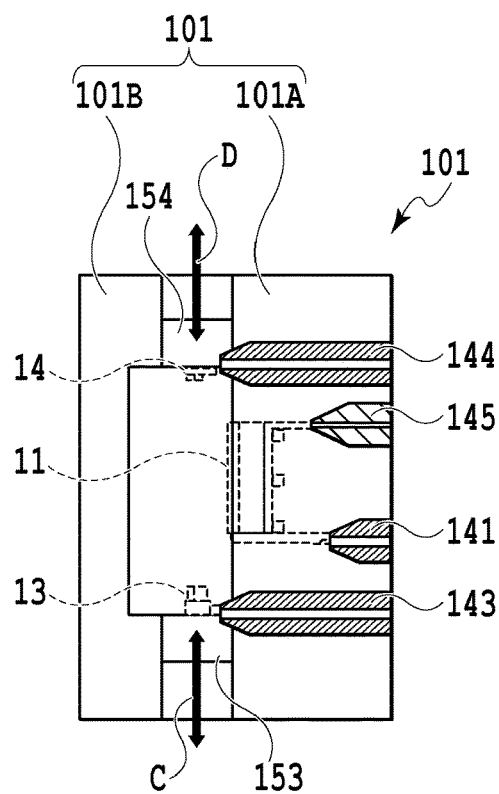
FIG. 10A is a schematic view of a sectional surface taken along line XA-XA of FIG. 9A.
Figure 10B:
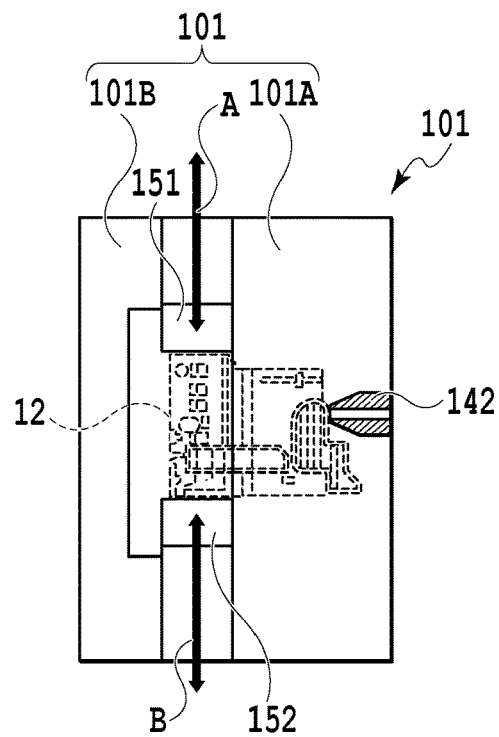
FIG. 10B is a schematic view of a sectional surface taken along line XB-XB of FIG. 9A.

FIG. 9A, FIG. 9B, FIG. 10A, and FIG. 10B are explanatory diagrams of the metal mold 101 immediately after primary molding of the first and second forming members 11 and 12 and the first and second cover members 13 and 14. FIG. 9A is a diagram viewing from an arrow IXA of FIG. 8, FIG. 9B is a diagram viewing from an arrow IXB of FIG. 9A, FIG. 10A is a schematic view of a sectional surface taken along line XA-XA of FIG. 9A, and FIG. 10B is a schematic view of a sectional surface taken along line XB-XB of FIG. 9A. Slides 151 and 152 are slides for configuring the curved flow path of the second forming member 12, and are respectively capable of sliding in the directions of arrows A and B. Slides 153 and 154 are slides for retaining the first and second cover members 13 and 14 and for incorporating the first and second cover members 13 and 14 into the second forming member, and are capable of sliding in the directions of arrows C and D which are identical to the directions of the arrows A and B.

FIG. 11A to FIG. 11D are explanatory diagrams of an assembling operation of the flow path constituent body 4 by using the metal mold 101.

Figure 11A:
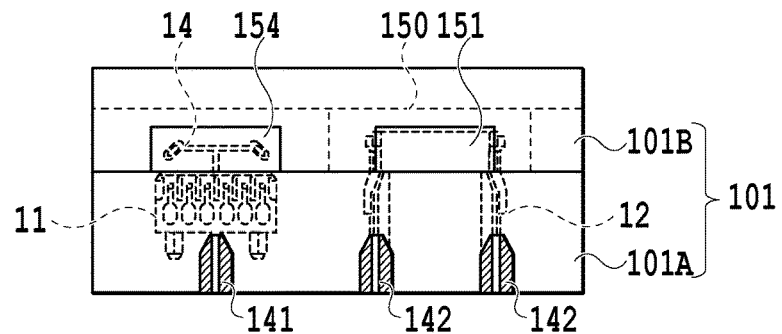
FIG. 11A, FIG. 11B, FIG. 11C, and FIG. 11D are respectively explanatory diagrams of an operation of the metal mold of FIG. 8.
Figure 11B:
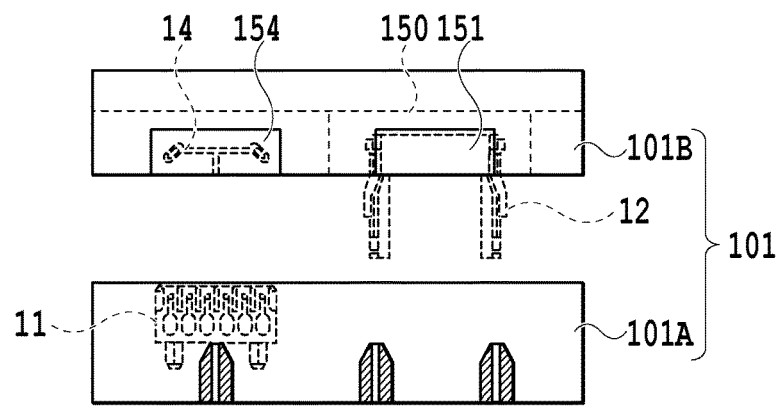

FIG. 11A illustrates a state where primary molding of the first and second forming members 11 and 12 and the first and second cover members 13 and 14 is completed. In the metal mold 101, four primary molding products are molded. FIG. 11B illustrates a state where the metal mold 101 is opened. The first forming member 11 is retained in a fixed side metal mold (a fixed metal mold) 101A of the metal mold 101, and the second forming member and the first and second cover members 13 and 14 are retained in a movable side metal mold (a movable metal mold) 101B of the metal mold 101. At this time, the first and second cover members 13 and 14 are respectively retained in the slides 153 and 154 of the movable metal mold 101B, and are moved in the directions of arrows C2 and D2 along with the slides 153 and 154.

Figure 11C:
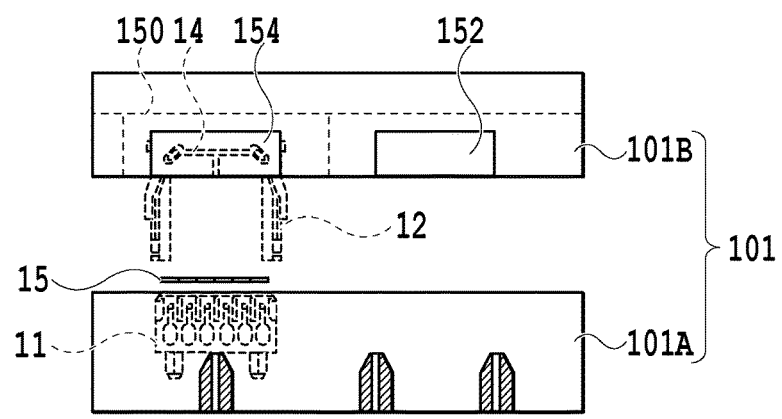

FIG. 11C illustrates a state where the movement of the movable metal mold 101B is completed by a die slide mechanism 150. The second forming member 12 retained in the movable metal mold 101B is moved by the die slide mechanism 150 to a position where the second forming member 12 faces the first forming member 11. The position where the second forming member 12 faces the first forming member 11 is a position where the second forming member 12 faces the slides 153 and 154.

Figure 11D:
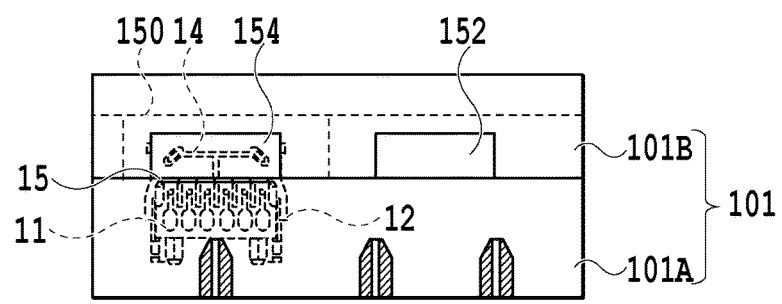

In order to form the curved flow path of the ink before the metal mold 101 is clamped again, the slides 153 and 154 are moved in the directions of arrows C1 and D1, and the first and second cover members 13 and 14 are brought into contact with the second forming member 12. In such a state, the filter 15 is inserted to any one of the first forming member 11 and the second forming member 12, and is temporarily fixed. It is desirable that the filter is inserted by using a robot hand or the like, in accordance with molding timing. FIG. 11D illustrates a state where the metal mold 101 is clamped again in order for the secondary injection molding. Such a state is identical to the assembled state of FIG. 3.

In a manufacturing step of FIG. 11A, the first forming member 11 is subjected to injection molding in a position (a first position) on the left side of a pair of metal molds 101A and 101B in the drawing, and the second forming member 12 is subjected to the injection molding in a position (a second position) on the right side of the metal molds 101A and 101B in the drawing. In a manufacturing step of FIG.

11B, the metal molds 101A and 101B are opened such that the first forming member 11 remains in one of the pair of metal molds (in this example, the metal mold 101A), and the second forming member 12 remains in the other one of the pair of metal molds (in this example, the metal mold 101B). In a manufacturing step of FIG. 11C, the metal molds 101A and 101B are relatively moved such that the first forming member 11 faces the second forming member 12, and the filter 15 is interposed between the first opening portion 11A and the second opening portion 12A. In a manufacturing step of FIG. 11D, the metal molds 101A and 101B are closed (mold closing) such that the filter 15 is compressed between facing surfaces of the first forming member 11 and the second forming member 12. In the subsequent step, the secondary molding resin 31 is poured between the facing surfaces of the first and second forming members 11 and 12.

In this example, the die slide mechanism 150 is driven by an electric cylinder, and the slides 151, 152, 153, and 154 are driven by a hydraulic cylinder. The type of such driving cylinders is suitably selected according to an attached facility, a metal mold space, or the like.

Figure 12A:
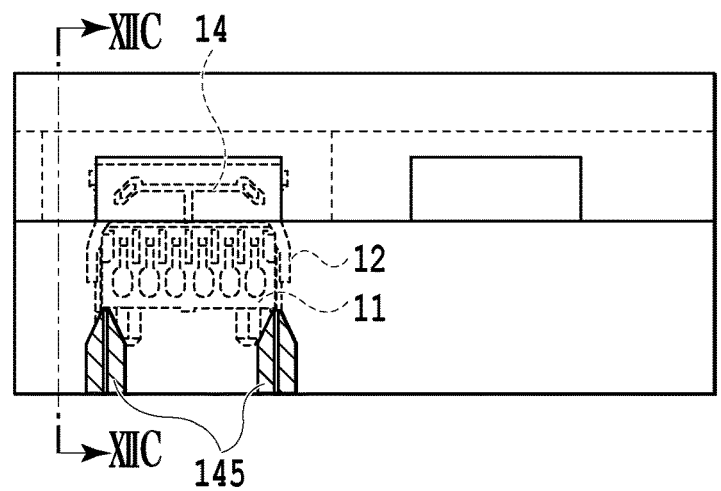
FIG. 12A is a plan view of the metal mold of FIG. 8.
Figure 12B:
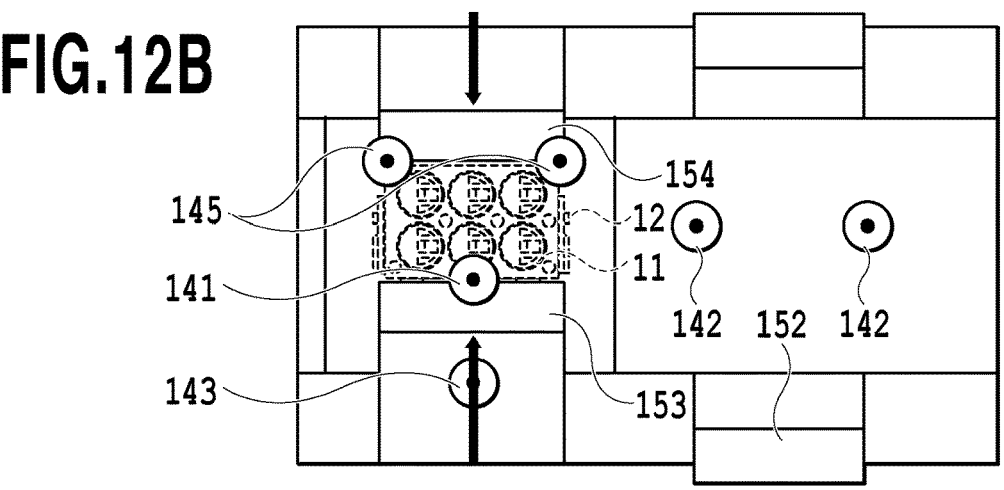
FIG. 12B is a front view of the metal mold of FIG. 8.
Figure 12C:
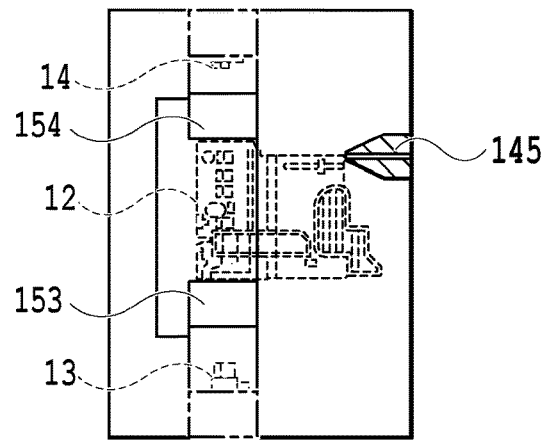
FIG. 12C is a schematic view of a sectional surface taken along line XIIC-XIIC of FIG. 12A.

FIG. 12A, FIG. 12B, and FIG. 12C are explanatory diagrams of the metal mold 101 at the time of the secondary injection molding. FIG. 12A is a plan view of the metal mold 101, FIG. 12B is a front view of the metal mold 101, and FIG. 12C is a schematic view of a sectional surface taken along line XIIC-XIIC of FIG. 12A. The secondary molding resin 31 is injected from the gate 145, and thus, as illustrated in FIG. 4A and FIG. 4B, four primary molding products and the filter 15 are integrated between the pair of metal molds.

Figure 13A:
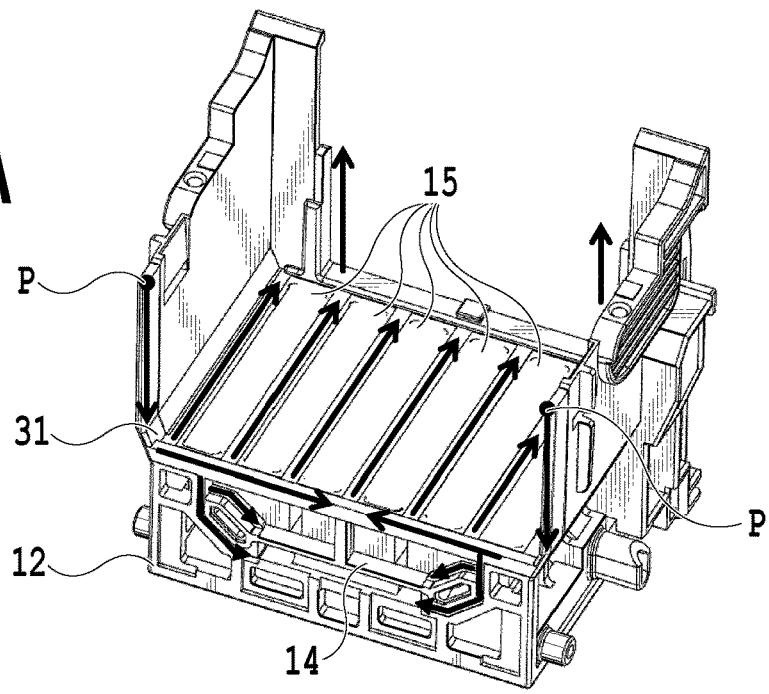
FIG. 13A and FIG. 13B are respectively explanatory diagrams of a flow of a molten resin to be injected from a gate of the metal mold of FIG. 8.
Figure 13B:
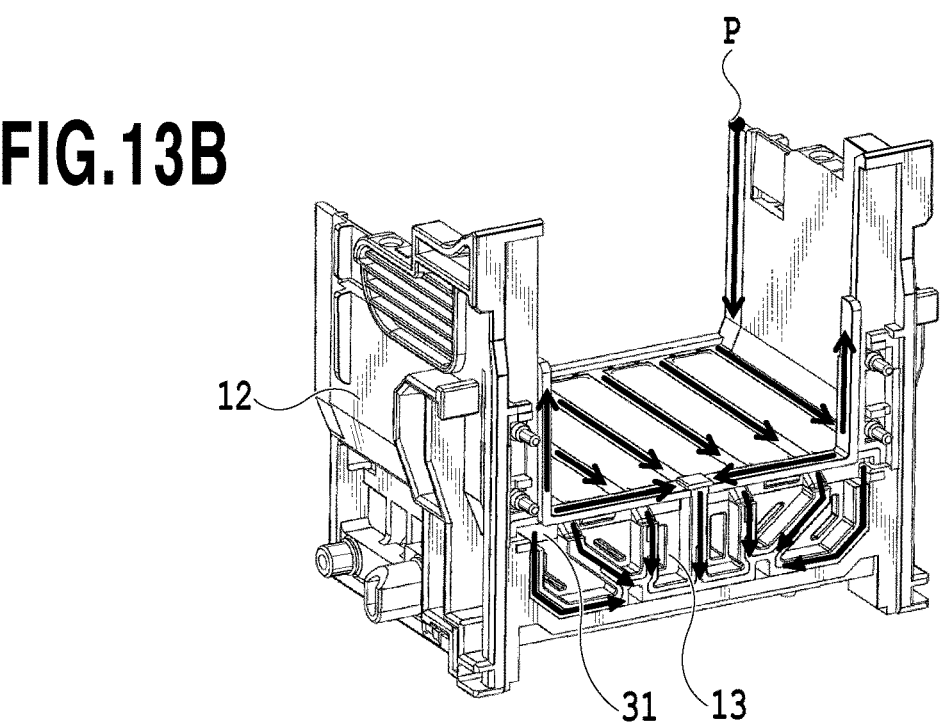

FIG. 13A and FIG. 13B are diagrams for illustrating the flow of the secondary molding resin 31 by omitting the illustration of the first forming member 11. In this example, the secondary molding resin 31 is injected from two gates 145. The secondary molding resin 31 ejected from the gates 145 flows in an arrow direction of FIG. 13A and FIG. 13B from positions P corresponding to the gates 145, and first, seals the circumference of the second cover member 14. After that, the secondary molding resin 31 seals the circumference of the filter 15, and then, seals the circumference of the first cover member 13 which is positioned in a back lower portion of the second forming member 12, seals and joins a portion between the first and second forming members 11 and 12. Such a portion is positioned in a back upper portion of the second forming member 12. According to the flow of the secondary molding resin 31, it is possible to seal the entire circumference of the filter 15, and to form the ink supply path.

Other Embodiments

It is desirable that the filter has a laminated structure including at least two filter layers having different opening sizes. For example, opening sizes of a first filter and a third filter may be larger than an opening size of a second filter, as a three-layer structure in which a first filter layer, a second filter layer, and a third filter layer are sequentially laminated. In addition, a sintered nonwoven fabric filter is desirable as the filter. Further, it is desirable that a wire diameter of an unwoven fabric fiber in a filter layer having a comparatively large opening size is greater than or equal to three times a wire diameter of an unwoven fabric fiber in a filter layer having a comparatively small opening size.

In addition, the invention is not limited to the ink supply component provided in the ink jet printing head, but is capable of being widely applied to a liquid supply component in which various liquid supply paths are formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127500 filed Jun. 28, 2016, which is hereby incorporated by reference wherein in its entirety.

What is claimed is:

1. A manufacturing method of a liquid supply component in which a first configuration component and a second configuration component are joined together such that a first opening portion of the first configuration component and a second opening portion of the second configuration component face each other, and thus, a liquid supply path communicating through the first opening portion and the second opening portion is formed, the method comprising:
    a first step of performing injection molding with respect to the first configuration component in a first position between a pair of metal molds, and of performing injection molding with respect to the second configuration component in a second position between the pair of metal molds;
    a second step of opening the pair of metal molds such that the first configuration component remains in one metal mold of the pair of metal molds, and the second configuration component remains in another metal mold of the pair of metal molds, and of relatively moving the pair of metal molds such that the first configuration component and the second configuration component face each other;
    a third step of interposing a sintered nonwoven fabric filter between the first opening portion and the second opening portion, the sintered nonwoven fabric filter having voids formed by fibers;
    a fourth step of closing the pair of metal molds such that a circumferential portion of the sintered nonwoven fabric filter is compressed between facing surfaces of the first configuration component and the second configuration component; and
    a fifth step of pouring a molten resin between the facing surfaces so at to contact the circumferential portion of the sintered nonwoven fabric filter,
    wherein the molten resin is a resin capable of entering the voids of the sintered nonwoven fabric filter, and
    wherein in the fourth step, a size of the voids of the circumferential portion is reduced by compression of the sintered nonwoven fabric filter so that the molten resin is suppressed from entering the voids from a surface of the circumferential portion.

2. The manufacturing method according to claim 1, wherein in the fifth step, the molten resin seals between the facing surfaces, and bonds the first configuration component and the second configuration component together.

3. The manufacturing method according to claim 1, wherein in the first step, a liquid storage space communicating with the first opening portion is formed in the first configuration component, and a curved flow path in communication with the second opening portion is formed in the second configuration component.

4. The manufacturing method according to claim 1, wherein in the fourth step, the sintered nonwoven fabric filter is compressed such that a thickness of the sintered nonwoven fabric filter is less than or equal to a half thereof before being compressed.

5. The manufacturing method according to claim 1, wherein the sintered nonwoven fabric filter has a laminated structure including at least two filter layers having different opening sizes.

6. The manufacturing method according to claim 5, wherein the sintered nonwoven fabric filter has a three-layer structure in which a first filter layer, a second filter layer, and a third filter layer are sequentially laminated, and opening sizes of the first filter layer and the third filter layer are larger than an opening size of the second filter layer.

7. The manufacturing method according to claim 5, wherein a wire diameter of a fiber in a filter layer having a large opening size is greater than or equal to three times a wire diameter of a fiber in a filter layer having a small opening size.

8. The manufacturing method according to claim 1, wherein the liquid supply path is an ink flow path for supplying an ink to an ink jet printing head.

9. The manufacturing method according to claim 1, wherein the sintered nonwoven fabric filter has a predetermined thickness, and wherein in the fourth step, the circumferential portion of the sintered nonwoven fabric filter is compressed such that a thickness of the circumferential portion is less than the predetermined thickness, and the molten resin is capable of entering the voids of the sintered nonwoven fabric filter with the predetermined thickness before the sintered nonwoven fabric filter is compressed.

* * * * *